(12) United States Patent
Sakita et al.

(10) Patent No.: US 8,388,041 B2
(45) Date of Patent: Mar. 5, 2013

(54) SPARE TIRE INSTALLATION STRUCTURE

(75) Inventors: Atsushi Sakita, Atsugi (JP); Takeshi Mishima, Hadano (JP); Masaya Watanabe, Kawasaki (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 13/376,600

(22) PCT Filed: Jul. 6, 2010

(86) PCT No.: PCT/IB2010/001657
§ 371 (c)(1),
(2), (4) Date: Dec. 7, 2011

(87) PCT Pub. No.: WO2011/004240
PCT Pub. Date: Jan. 13, 2011

(65) Prior Publication Data
US 2012/0080906 A1  Apr. 5, 2012

(30) Foreign Application Priority Data
Jul. 6, 2009  (JP) .................................. 2009-159874
Mar. 11, 2010  (JP) .................................. 2010-054609

(51) Int. Cl.
*B62D 43/00* (2006.01)
(52) U.S. Cl. .................................. 296/37.2; 296/187.11
(58) Field of Classification Search ................. 296/37.2, 296/37.3, 187.11; 224/42.11–42.3
See application file for complete search history.

(56) References Cited

U.S. PATENT DOCUMENTS

| 7,270,365 B2 * | 9/2007 | Suzuki et al. ............. 296/187.08 |
| 7,540,559 B2 * | 6/2009 | Egawa et al. ............. 296/203.04 |
| 7,731,257 B2 * | 6/2010 | Venuto et al. ................ 296/37.2 |
| 2008/0073390 A1 | 3/2008 | Venuto et al. |

FOREIGN PATENT DOCUMENTS

| JP | 2006 137329 A | 6/2006 |
| JP | 2006 290272 A | 10/2006 |

OTHER PUBLICATIONS

International Search Report from PCT/IB2010/001657 dated Oct. 15, 2010 (4 pages).
International Preliminary Report on Patentability and Written Opinion issued in International Application No. PCT/IB2010/001657, dated Jan. 10, 2012 (8 pages).

* cited by examiner

*Primary Examiner* — Dennis Pedder
(74) *Attorney, Agent, or Firm* — Osha Liang LLP (57) ABSTRACT

A spare tire installation structure for a vehicle has a first rigid member disposed within a trunk compartment of the vehicle, and a second rigid member configured vehicle rearward of the first rigid member and disposed within the trunk compartment of the vehicle. The first rigid member and the second rigid member define a space to house a spare tire. The second rigid member is configured to displace the spare tire vehicle forward and into the first rigid member in response to a rear collision to the vehicle. The first rigid member is configured to split a wheel of the spare tire.

22 Claims, 10 Drawing Sheets

SPARE TIRE INSTALLATION STRUCTURE

CROSS-REFERENCE TO RELATED APPLICATIONS

The present application claims priority from Japanese Patent Application No. 2009-159874, filed Jul. 6, 2009, and Japanese Patent Application No. 2010-054609, filed Mar. 11, 2010. The contents of the priority applications are hereby incorporated by reference in their entireties.

TECHNICAL FIELD

The present disclosure relates to a spare-tire installation structure for a vehicle that provides superior impact absorption properties upon collision with minimal addition to vehicle body weight.

BACKGROUND OF INVENTION

1. Field of the Invention

The present disclosure relates to a spare-tire installation structure for a vehicle that provides superior impact absorption properties upon collision with minimal addition to vehicle body weight.

2. Description of the Related Art

A spare tire is structurally designed to have at least a predetermined strength to serve as a road tire by taking into account the force applied from a road surface inward or outward in the radial direction of the tire and the environment in which the spare tire may be used.

A typical spare tire, as assembled, has a rubber spare tire body fitted around a metal spare tire wheel.

The spare tire wheel integrally includes a substantially cylindrical drum equipped with the spare tire body and a substantially disk-shaped spoke surface located on the side of the drum that faces the outside of the vehicle when the spare tire is attached to the vehicle for use.

To install the spare tire in a trunk room provided in the rear of the vehicle, for example, the spare tire is accommodated in a spare-tire installation area provided on a floor panel surface in the rear of the vehicle so that the spoke surface lies in a substantially horizontal position.

However, if the spare tire is installed in a substantially horizontal orientation on the floor panel surface in the rear of the vehicle, the radial direction of the tire, in which the tire has relatively high rigidity, corresponds to the longitudinal direction of the vehicle that may also be the direction in which a crushable zone extends.

Because the spare tire and wheel are resistant to fracture or collapse, the spare tire may make it difficult to provide a desired crushable zone for the rear structure of the vehicle. This may degrade impact absorption properties in the event of a rear collision.

Accordingly, examples of known structures include one that allows the spare tire to be rotated so as to tilt frontward or rearward as the rear of the vehicle is deformed upon rear collision (see, for example, Japanese Unexamined Patent Application Publication No. 2006-137329) and one that allows the spare tire to fall toward the bottom of the vehicle without being held between other vehicle components to ensure a desired crushable zone (see, for example, Japanese Unexamined Patent Application Publication No. 2006-290272).

However, the structure that allows a conventional spare tire to be rotated so as to tilt frontward or rearward, and the structure that allows a conventional spare tire to fall toward the bottom of the vehicle without being held between other vehicle components to ensure a desired crushable zone result in a complicated vehicle structure and may, therefore, increase weight and production costs.

SUMMARY OF INVENTION

In one aspect, embodiments disclosed herein include a spare tire installation structure for a vehicle having a first rigid member disposed within a trunk compartment of the vehicle and a second rigid member configured vehicle rearward of the first rigid member and disposed within the trunk compartment of the vehicle, wherein the first rigid member and the second rigid member define a space to house a spare tire, and the second rigid member is configured to displace the spare tire vehicle forward and into the first rigid member in response to a rear collision to the vehicle.

In another aspect, embodiments disclosed herein include a method to split a spare tire of a vehicle including disposing a first rigid member in a trunk compartment of the vehicle, disposing a second rigid member in the trunk compartment and vehicle rearward of the first rigid member, disposing a spare tire between the first rigid member and the second rigid member, and configuring the second rigid member to displace the spare tire vehicle forward and into the first rigid member in response to a rear-end collision to the vehicle.

In another aspect, embodiments disclosed herein include a spare tire installation structure of a vehicle including a means for displacing a spare tire disposed in a trunk compartment of a vehicle and a means for splitting a wheel of the spare tire disposed in the trunk compartment and vehicle forward of the means for displacing the spare tire, wherein the means for displacing the spare tire is configured to displace the spare tire in a vehicle forward direction into the means for splitting a wheel in response to a rear-end collision to the vehicle.

DETAILED DESCRIPTION

A spare-tire installation structure according to one or more embodiments of the present disclosure will now be described with reference to the drawings.

FIGS. 1 to 5 show a spare-tire installation structure according to one or more embodiments of the present disclosure.

Figure 1:
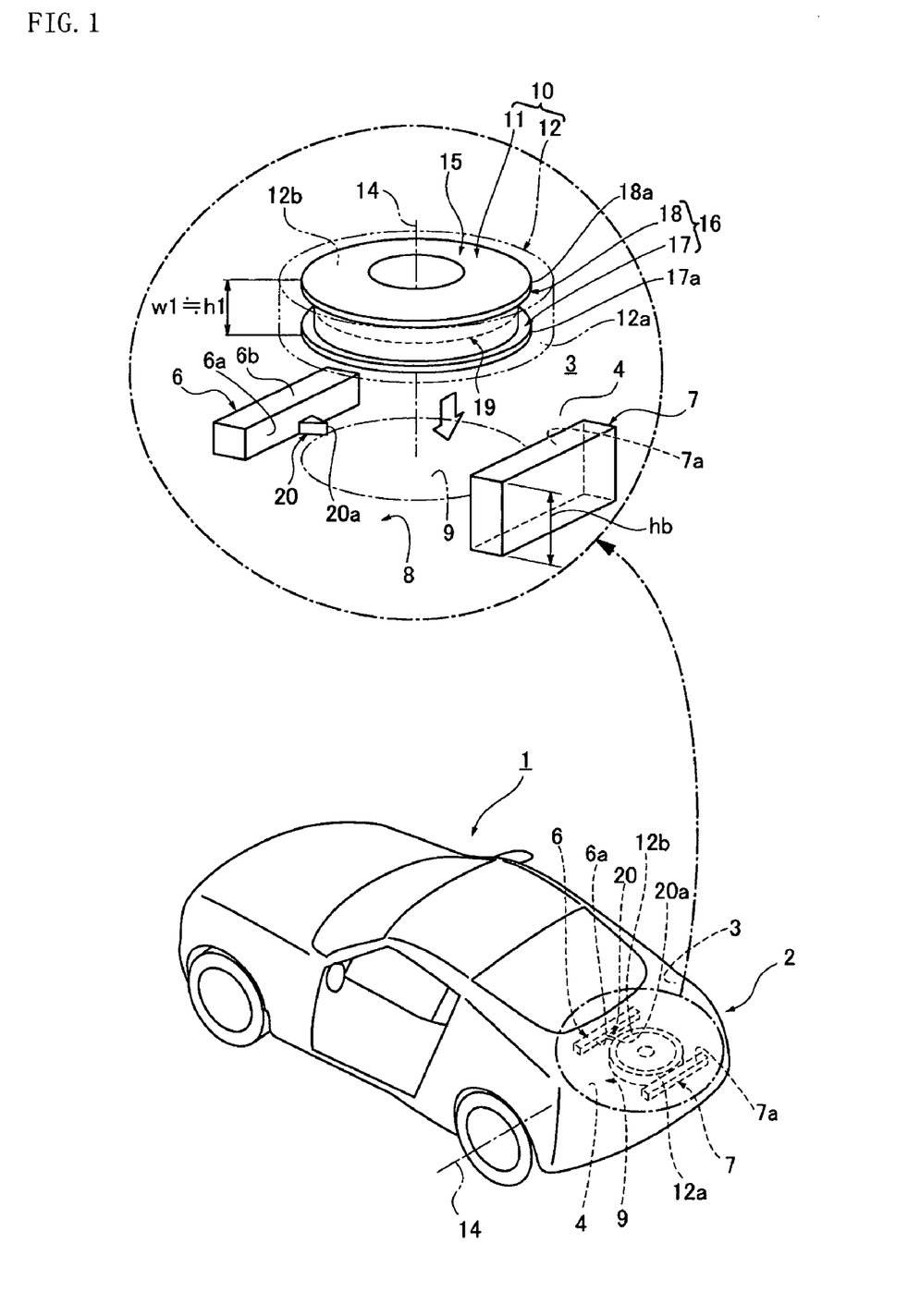
FIG. 1 is a perspective view of a spare-tire installation structure according to one or more embodiments of the present disclosure as viewed from the rear of a vehicle, illustrating the overall structure, with an enlarged perspective view, partially in cross section, of a relevant part of the spare-tire installation structure.
Figure 2:
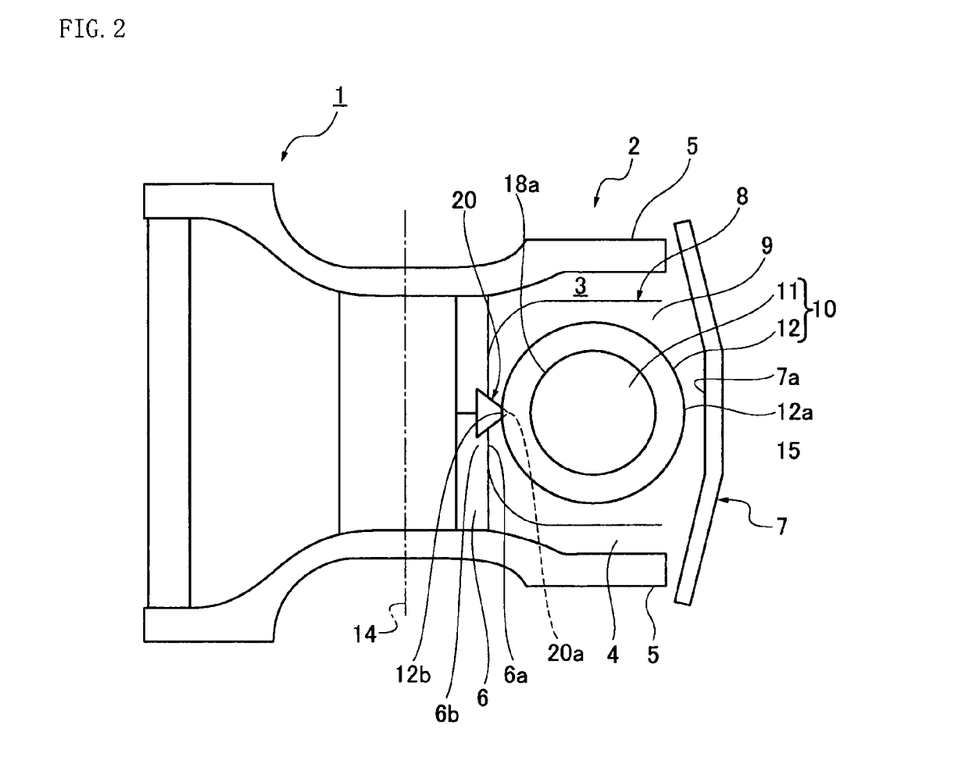
FIG. 2 is a schematic plan view of the spare-tire installation structure according to one or more embodiments of the present disclosure, illustrating a spare-tire installation area in the rear of the vehicle and the vicinity thereof.
Figure 3:
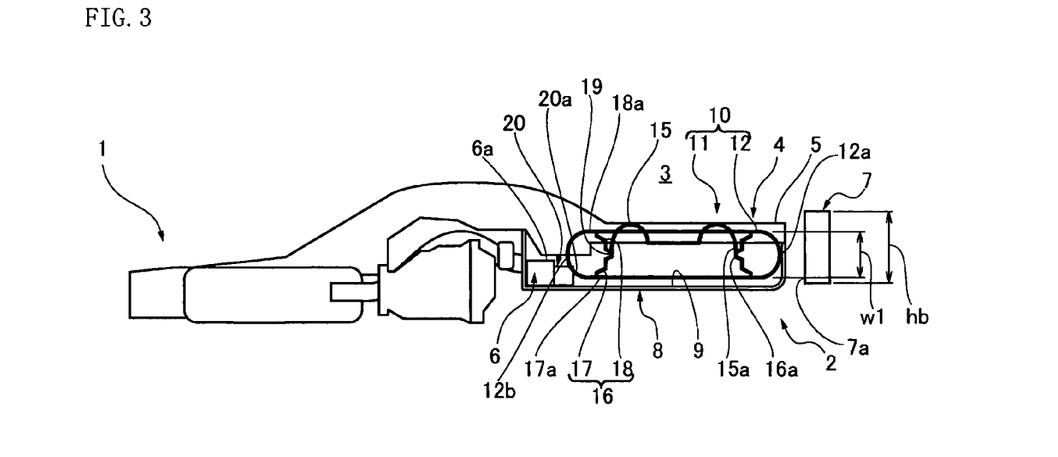
FIG. 3 is a schematic side view of the spare-tire installation structure according to the embodiment, illustrating the rear structure of the vehicle.

First, the overall structure will be described. For the spare-tire installation structure according to one or more embodiments of the present disclosure, a trunk room 3 may be provided in a rear section 2 of a vehicle 1.

A pair of rear side members 5 may be disposed to the left and right of a floor 4 of the trunk room 3 in the width direction of the vehicle 1. A rear cross member 6, serving as a first rigid member, may extend from one rear side member 5 to another rear side member 5. A rear bumper reinforcement 7, serving as a second rigid member, may extend so that a longitudinal direction may lie along rear ends of the rear side members 5.

A rear floor panel 8 may be disposed between the rear bumper reinforcement 7 and the rear cross member 6 and may have a spare-tire installation area 9 where a spare tire 10 may be installed in a substantially horizontal position.

As shown, the spare tire 10 may include a metal spare tire wheel 11 and a rubber spare tire body 12. Further, the spare tire wheel 11 may include a wide cylindrical drum 16 around which the spare tire body 12 may be fitted and secured, and a spoke surface 15 on one side of the drum 16. When the spare tire 10 is installed in the vehicle 1, the spoke surface 15 may face outward in the lateral direction of the vehicle 1, and the drum 16 may be positioned inward in the lateral direction of the vehicle 1 from the spoke surface 15.

The spare tire wheel 11 may be fixed to the rear floor panel 8 using, for example, bolts, nuts, and/or any other attachment means (not shown) when the spare tire 10 is installed in a substantially horizontal position in the spare-tire installation area 9 defined in the rear section 2 of the vehicle 1.

The drum 16, located inside the spare tire body 12, may have the spare tire body 12 fitted therearound. The drum 16 may include an annular inner drum portion 17 disposed on the side of the drum 16 opposite the spoke surface 15 and an outer drum portion 18 disposed on the same side of the spoke surface 15 such that the drum portion 18 surrounds the spoke surface 15. The inner and outer drum portions 17 and 18 may join at a junction 19.

An annular outer rim ring 18a may be integrally formed at the distal end (outermost when installed on the vehicle 1) of the outer drum portion 18 to prevent the spare tire body 12 fitted therearound from coming off. In addition, an annular inner rim ring 17a may be integrally formed at the distal end (innermost end when installed on the vehicle 1) of the inner drum portion 17 to prevent the spare tire body 12 fitted therearound from coming off.

As shown in FIG. 1, the rim width w1, between the inner and outer rim rings 17a and 18a, may be substantially equal to, or slightly smaller than, the height h1 of the circumferential surface of the tire body 12.

The rear bumper reinforcement 7 may be disposed at the rear of the spare tire 10 and may be formed so that the height hb of a front surface 7a of the rear bumper reinforcement 7 is larger than the rim width w1 of the drum 16 of the spare tire wheel 11, such that an upper surface of the rear bumper reinforcement 7 may extend above the drum 16 (above outer rim 18a in FIG. 3) and a lower surface of the rear bumper reinforcement 7 may extend below the drum 16 (below outer rim ring 17a in FIG. 3).

In accordance with one or more embodiments of the present disclosure, the junction 19 of the drum 16, where the inner and outer drum portions 17 and 18 may join, may be defined as a rigidity-varying portion of the spare tire wheel 11. The junction 19 may be formed in a different shape from the other drum portions 17 and 18 in terms of thickness and bending angle so that the rigidity may vary in the direction along the central axis of rotation 14.

In accordance with one or more embodiments of the present disclosure, as shown in FIG. 3, the drum 16 may have a spoke-surface-fixed portion 16a near the junction 19 of the spare tire wheel 11. A peripheral edge 15a of the spoke surface 15 may be internally adjacent to the spoke-surface-fixed portion 16a and may be integrally fixed over the entire circumference thereof.

In addition, a wheel-fracture facilitating member 20 may be provided on the vehicle side as part of the first rigid member so as to extend from the rear surface 6a of the rear cross member 6 toward the spare-tire installation area 9. The wheel-fracture facilitating member 20 may be disposed adjacent to the inner drum portion 17 side with respect to the junction 19. In accordance with one or more embodiments of the present disclosure, the wheel-fracture facilitating member 20 may be a wedge and may have the shape of an acute isosceles triangle with an acute end 20a in plan view. The acute end 20a may abut the circumferential surface of the spare tire 10 on the side thereof facing the front of the vehicle 1.

During a rear collision, the acute end 20a may cut a wedge form into the front of the circumferential surface of the spare tire body 12 fitted around the spare tire wheel 11 on the inner drum portion 17 side thereof, thus easily coming into abutment with the annular inner drum portion 17.

Figure 4:
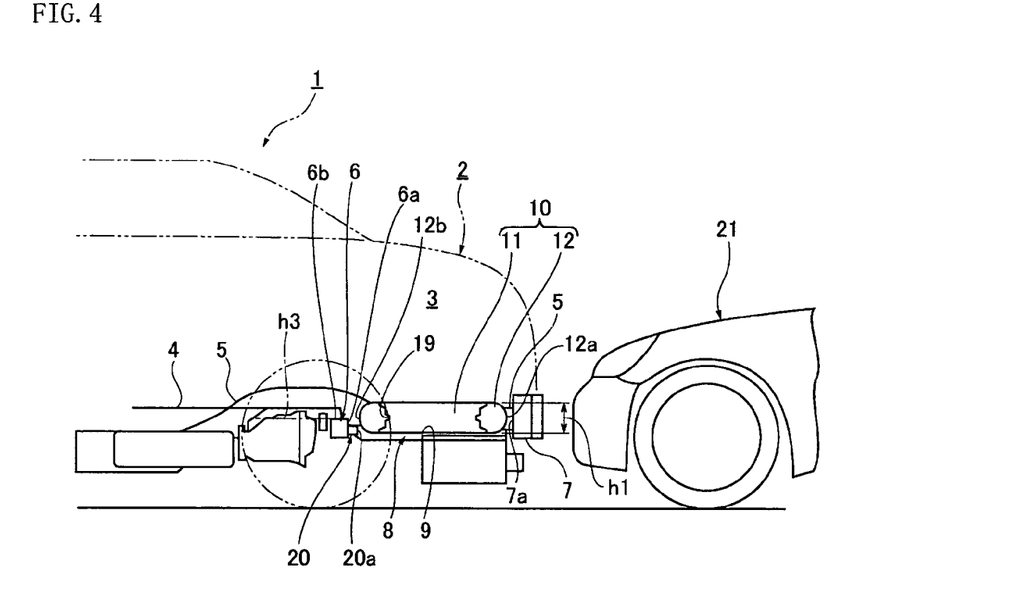
FIG. 4 is a schematic side view of the spare-tire installation structure according to one or more embodiments of the present disclosure, illustrating the rear structure of the vehicle before rear collision.

As shown in FIG. 4, the front surface 7a of the rear bumper reinforcement 7 may come into abutment with the circumferential surface of the spare tire body 12 on the side 12a thereof facing the rear of the vehicle 1. The rear bumper reinforcement 7 may contact the spare tire 10 over a region along the height h1 during a rear collision, thus pushing the spare tire 10 toward the front of the vehicle 1, as shown in FIG. 5.

As shown in FIGS. 1 to 3, the spare tire 10 may be installed in the spare-tire installation area 9 of the trunk room 3 of the vehicle 1. Further, as shown in FIGS. 4 and 5, if another vehicle 21 collides with the rear end of the vehicle 1, the rear bumper and the rear bumper reinforcement 7 may be deformed as the rear section 2 of the vehicle 1 is deformed.

The front surface 7a of the rear bumper reinforcement 7 may be disposed opposite the spare tire 10 over the rim width w1 between the inner and outer rim rings 17a and 18a of the drum 16 of the spare tire wheel 11. Upon impact, the front surface 7a may come into abutment with the circumferential surface of the spare tire body 12 on the side 12a thereof facing the rear of the vehicle 1 over a region along the height h1.

Figure 5:
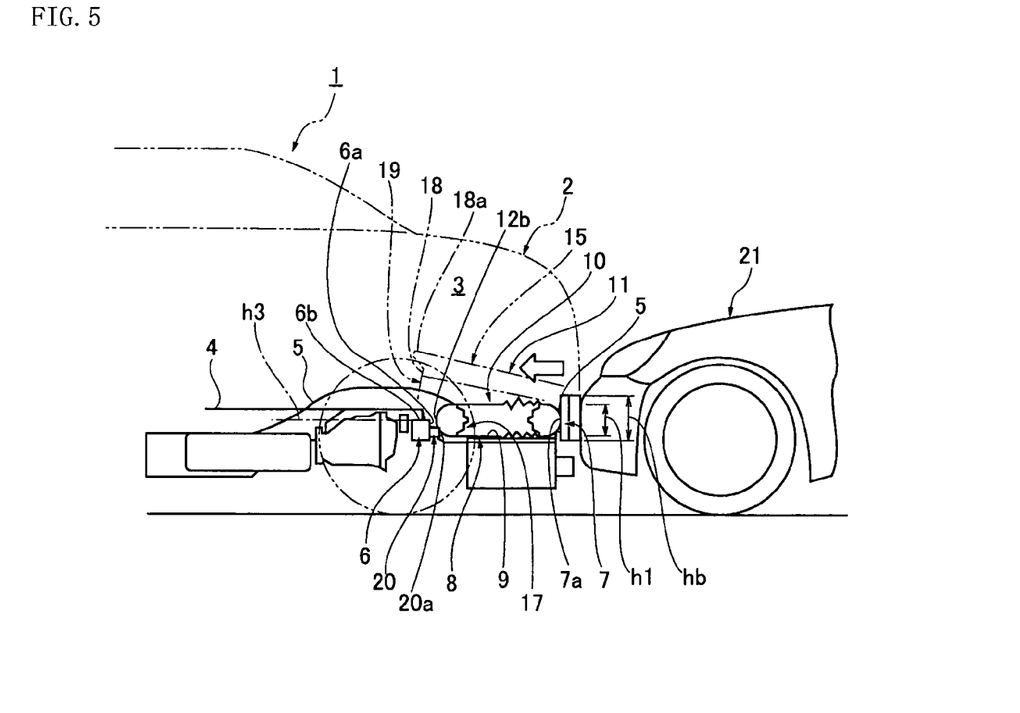
FIG. 5 is a schematic side view of the spare-tire installation structure according to one or more embodiments of the present disclosure, illustrating the rear structure of the vehicle after rear collision.

As shown in FIG. 5, during a rear collision, the spare tire 10 may be pressed toward the front of the vehicle 1 in a vertical direction of the vehicle 1, may be reliably moved toward the front of the vehicle 1 without rotating, and may be pushed toward the rear cross member 6 disposed adjacent to the inner drum portion 17.

As a front end 12b of the circumferential surface of the spare tire body 12 of the spare tire 10 may be moved into abutment with the acute end 20a of the wheel-fracture facilitating member 20 provided on the rear surface 6a of the rear cross member 6, the spare tire 10 may be held between the front surface 7a of the rear bumper reinforcement 7 and the rear surface 6a of the rear cross member 6 and may be pressed therebetween in a longitudinal direction of the vehicle 1.

During a rear collision, the acute end 20a of the wheel-fracture facilitating member 20 may cut into the front end 12b of the circumferential surface of the spare tire body 12 on the inner drum portion 17 side thereof, thus reaching the inner rim ring 17a of the annular inner drum portion 17.

The acute end 20a may then cut into the annular inner rim ring 17a integrally formed at the innermost end of the inner drum portion 17 of the drum 16 to fracture the inner drum portion 17 into left and right halves in a lateral direction of the vehicle 1.

At the same time, a shear force acting in the longitudinal direction of the vehicle 1 may be applied between the inner drum portion 17, located opposite the wheel-fracture facilitating member 20, and the outer drum portion 18, which may then be moved upward and forward toward the front of the vehicle 1 upon rear collision, with respect to the inner drum portion 18.

In accordance with one or more embodiments of the present disclosure, the height of the junction 19 may correspond to the height h3 of a top corner between the rear surface 6a and a top surface 6b of the rear cross member 6. Thus, the spare tire wheel 11 may easily fracture at the junction 19, where the rigidity of the drum 16 may vary significantly.

As indicated by the two-dot chain line in FIG. 5, the outer drum portion 18 and the spoke surface 15, which may have a relatively high rigidity and may be located on the top side of the spare tire 10, may be moved toward the front of the vehicle 1 without hindrance while being separated diagonally upward from the inner drum portion 17.

Thus, a desired crushable zone is ensured so that the vehicle body can be crushed without hindrance. With the desired crushable zone, the body structure provides superior impact absorption properties.

The wheel-fracture facilitating member 20, having the shape of the acute isosceles triangle with the acute end 20a in plan view, may fracture the inner drum portion 17 into left and right halves in the width direction of the vehicle 1, each half being bendable and/or compressible. The left and right halves of the inner drum portion 17 may have a lower rigidity than the annular spare tire wheel 11 as a whole.

Thus, there may be no hindrance to facilitation of deformation upon rear collision in the rear section 2 of the vehicle 1, so that the vehicle body may be crushed without hindrance. This may allow a crushable zone to provide superior impact absorption properties.

In addition, the wheel-fracture facilitating member 20 may be simply fixed to a conventional rear cross member 6 on one side of the inner drum portion 17 so as to protrude from the rear surface 6a of the rear cross member 6. This may be achieved with the minimum increase in a number of components.

Thus, the wheel-fracture facilitating member 20 may be easy to locate and fix, and the impact absorption properties upon rear collision may be improved by a simple, lightweight structure.

In the spare-tire installation structure according to one or more embodiments of the present disclosure, the junction 19 (the rigidity-varying portion of the spare tire wheel 11) may be defined near the spoke-surface-fixed portion 16a of the drum 16 to which the peripheral edge 15a of the spoke surface 15 may be fixed.

Because the spoke surface 15 may have a higher rigidity than the drum 16, the rigidity of the spare tire wheel 11 may vary significantly near the spoke-surface-fixed portion 16a to which the peripheral edge 15a may be fixed.

In the spare-tire installation structure according to one or more embodiments of the present disclosure, additionally, the junction 19 between the inner and outer drum portions 17 and 18 of the drum 16 may defined as the rigidity-varying portion of the spare tire wheel 11. Thus, the position of the rigidity-varying portion may be easily changed in the vertical direction of the vehicle 1.

In the spare-tire installation structure according to one or more embodiments of the present disclosure, additionally, the spoke-surface-fixed portion 16a of the drum 16 to which the peripheral edge 15a of the spoke surface 15 may be fixed may be defined at the junction 19 between the inner and outer drum portions 17 and 18. Thus, the rigidity of the spare tire wheel 11 may vary significantly at the junction 19.

Figure 6:
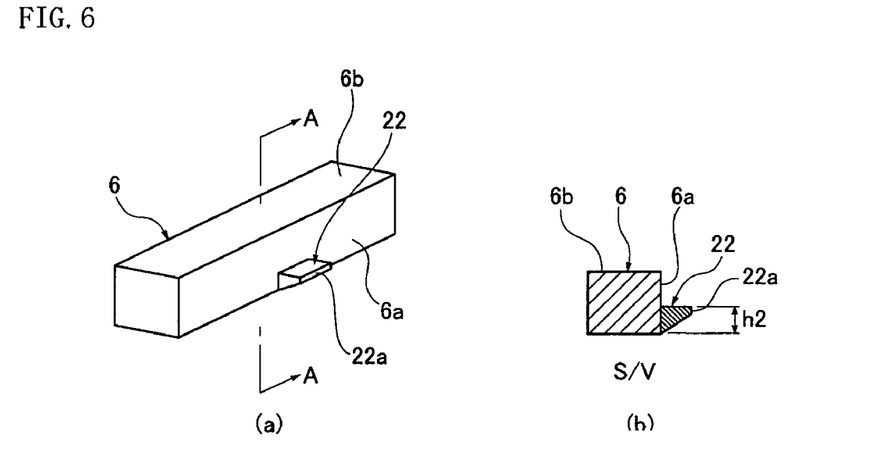
FIG. 6(a) is a schematic perspective view of a component of a spare-tire installation structure in accordance with one or more embodiments of the present disclosure.
FIG. 6(b) is a cross-sectional view taken along line A-A in FIG. 6(a)

FIGS. 6(a) and 6(b) show a spare-tire installation structure in accordance with one or more embodiments of the present disclosure. The same or equivalent elements as in the embodiments described above are denoted by the same reference numerals.

In the spare-tire installation structure as shown in FIG. 6(a), instead of the wheel-fracture facilitating member 20 of the embodiment described above, a wedge-shaped wheel-fracture facilitating member 22 serving as part of the first rigid member may be fixed to the rear surface 6a of the rear cross member 6 serving as the first rigid member and may have an end 22a protruding toward the spare-tire installation area 9, that is, toward the rear of the vehicle 1.

As shown in FIG. 6(b), the wedge-shaped wheel-fracture facilitating member 22 may have the shape of a substantially right triangle in side view and may be disposed adjacent to the inner drum portion 17 of the drum 16 such that the height of the end 22a in the vertical direction of the vehicle 1 may be close to that of the junction 19 of the spare tire wheel 11 of the spare tire 10.

In accordance with one or more embodiments of the present disclosure, the wedge-shaped wheel-fracture facilitating member 22 may have the shape of a substantially right triangle in side view, and the height h2 of the end 22a in the vertical direction of the vehicle 1 may be close to that of the junction 19 of the spare tire wheel 11 of the spare tire 10.

Thus, as the spare tire 10 is moved toward the front of the vehicle 1 upon rear collision, the end 22a of the wedge-shaped wheel-fracture facilitating member 22 may come into abutment with and cut into the front end 12b of the circumferential surface of the spare tire body 12 of the spare tire 10 while imposing a load on the drum portion 17 that may bend.

Forming a cut with a longitudinal direction lying in a substantially horizontal direction near the junction 19, the end 22a may facilitate a fracture between the inner and outer drum portions 17 and 18.

Figure 7:
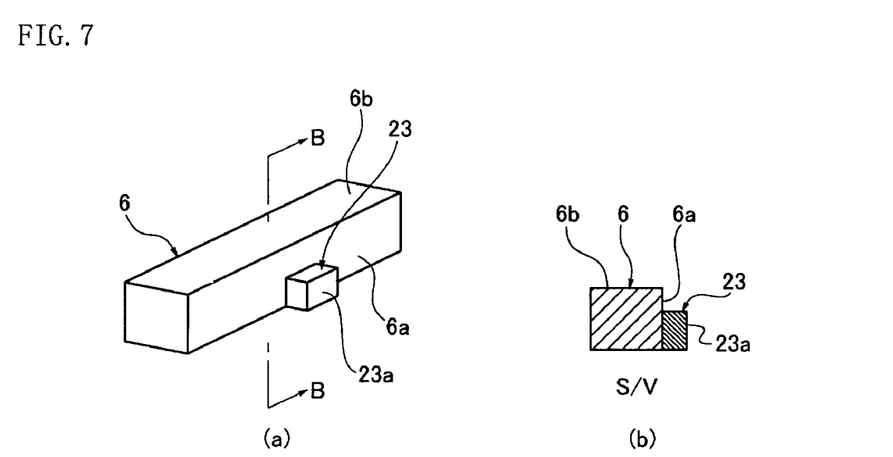
FIG. 7(a) is a schematic perspective view of a component of a spare-tire installation structure in accordance with one or more embodiments of the present disclosure.
FIG. 7(b) is a cross-sectional view taken along line B-B in FIG. 7(a)

Referring now to FIG. 7, a spare-tire installation structure in accordance with one or more embodiments of the present disclosure is shown. The same or equivalent elements as in the embodiments described above are denoted by the same reference numerals.

In the spare-tire installation structure as shown in FIG. 7, instead of the wheel-fracture facilitating member 20 of the embodiments described above, a rectangular wheel-fracture facilitating member 23 may serve as part of the first rigid member that may be fixed to the rear surface 6a of the rear cross member 6 serving as the first rigid member.

The rectangular wheel-fracture facilitating member 23 may have a substantially rectangular contact end surface 23a located on a rear end thereof so as to protrude toward the spare-tire installation area 9, that is, toward the rear of the vehicle 1. The contact end surface 23a may be located adjacent to the inner drum portion 17 of the spare tire wheel 11.

As shown in FIG. 7, the rectangular wheel-fracture facilitating member 23 may come into abutment with the front end 12b of the circumferential surface of the spare tire body 12 over a wide area on the inner drum portion 17 side thereof so that the contact end surface 23a may come into surface contact with the spare tire 10.

Thus, the possibility of the spare tire 10 deviating from the desired movement direction upon rear collision may be reduced. Accordingly, the spare tire 10 may be stably fractured.

Figure 8:
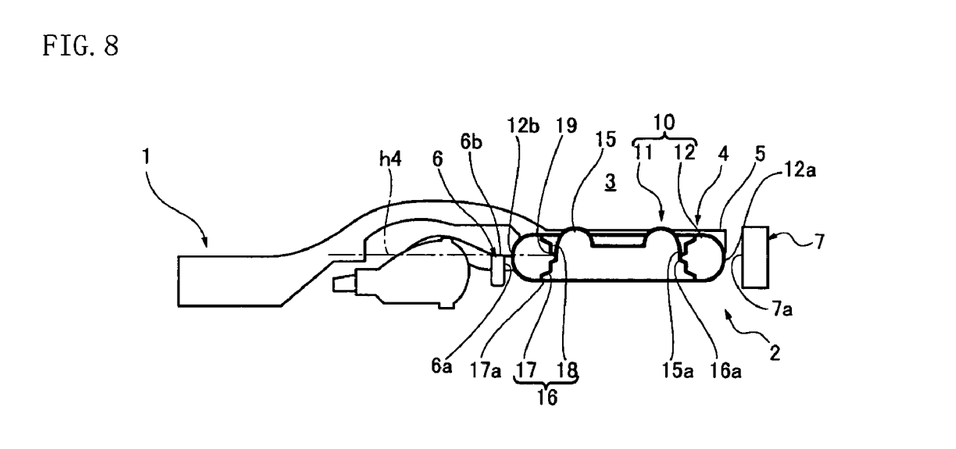
FIG. 8 is a schematic side view of a component of a spare-tire installation structure in accordance with one or more embodiments of the present disclosure.
Figure 9:
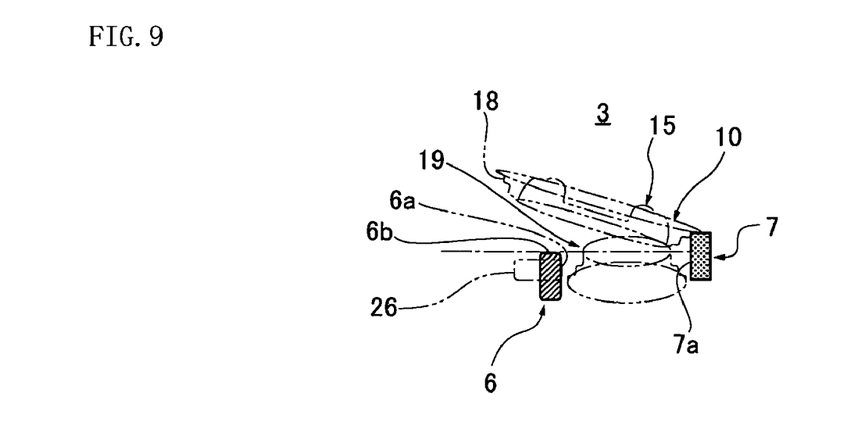
FIG. 9 is a schematic enlarged side view of the spare-tire installation structure in accordance with one or more embodiments of the present disclosure, showing an example of the state of a spare tire after collision.

Referring now to FIGS. 8 and 9, a spare-tire installation structure in accordance with one or more embodiments of the present disclosure is shown. The same or equivalent elements as in the embodiments described above are denoted by the same reference numerals.

In the spare-tire installation structure as shown in FIGS. 8 and 9, instead of the wheel-fracture facilitating member 20 of the embodiment described above, the rear cross member 6, which constitutes part of the rear section 2 of the vehicle 1, may serve as the first rigid member.

Specifically, as shown in FIGS. 8 and 9, the rear cross member 6 may be disposed opposite the front end 12b of the circumferential surface of the spare tire 10 on the inner drum portion 17 side with respect to the junction 19.

As indicated by the solid line in FIG. 9, the width direction the cross-sectional shape of the rear cross member 6 lies in the vertical direction of the vehicle 1. The position of the top surface 6b of the rear cross member 6 in the vertical direction of the vehicle 1 corresponds with a position of the junction 19 in the vertical direction of the vehicle 1.

As shown in FIGS. 8 and 9, if the spare tire 10 is pushed toward the front of the vehicle 1 upon a rear collision the front end 12b of the circumferential surface of the spare tire body 12 may come into abutment with the rear surface 6a of the rear cross member 6 on the inner drum portion 17 side thereof.

Thus, the drum 16 of the spare tire wheel 11 may be pressed on the inner drum portion 17 side, where the inner rim ring 17a may be disposed, through the front end 12b of the circumferential surface of the spare tire body 12 so that a holding force may act on the drum 16 with respect to the junction 19.

Accordingly, the holding pressure applied in the longitudinal direction of the vehicle 1 may act as a shear force to separate the outer drum portion 18 and the spoke surface 15 from the inner drum portion 17, as indicated by the two-dot chain lines shown in FIG. 9.

As shown in FIG. 8, the height of the junction 19 may correspond with the height h4 of the top corner where the top end of the rear surface 6a and the top surface 6b of the rear cross member 6 join. The spare tire wheel 11 may, therefore, be easily fractured at the junction 19, where the rigidity of the drum 16 may vary significantly.

Thus, there may be no hindrance to facilitation of deformation upon rear collision in the rear section 2 of the vehicle 1. This may allow the desired crushable zone to provide superior impact absorption properties.

In addition, the rear cross member 6 may be simply disposed on the inner drum portion 17 side with respect to the junction 19, which may serve as the rigidity-varying portion of the spare tire wheel 11. This may allow the impact absorption properties upon rear collision to be improved by a simple, lightweight structure.

In the spare-tire installation structure as shown in FIGS. 8 and 9, the rear cross member 6, which constitutes part of the rear section 2 of the vehicle 1, may serve as the first rigid member. This may reduce the number of components, thus alleviating an increase in body weight and cost.

Figure 10:
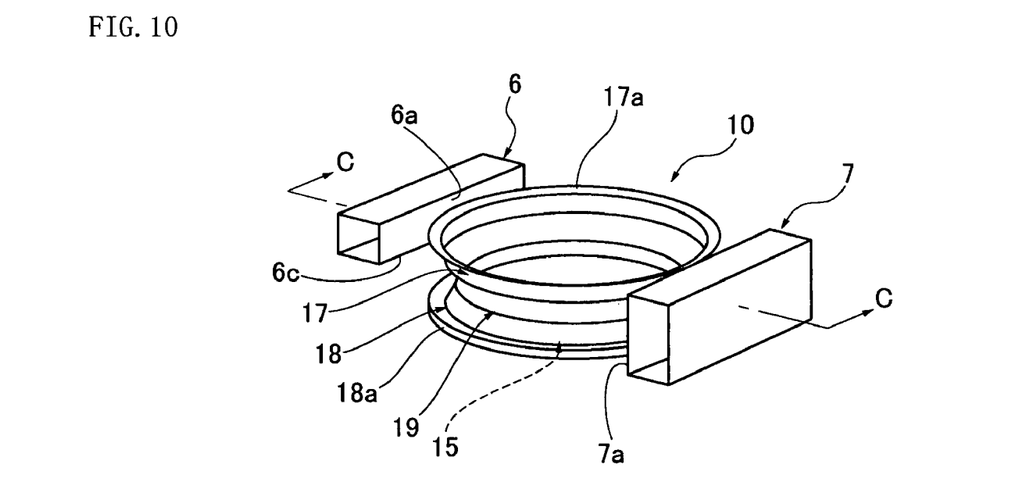
FIG. 10 is an enlarged perspective view, partially in cross section, of a component of a spare-tire installation structure in accordance with one or more embodiments of the present disclosure.
Figure 11:
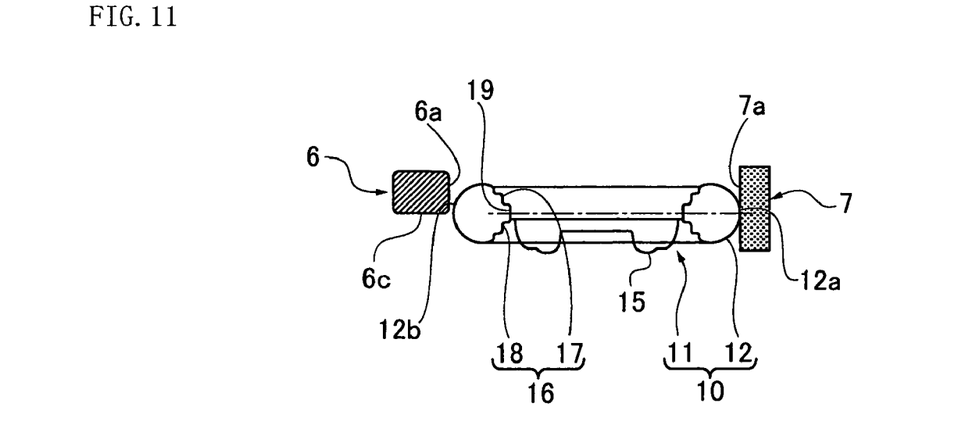
FIG. 11 is an enlarged cross-sectional view of a component of a spare-tire installation structure in accordance with one or more embodiments of the present disclosure.
Figure 12:
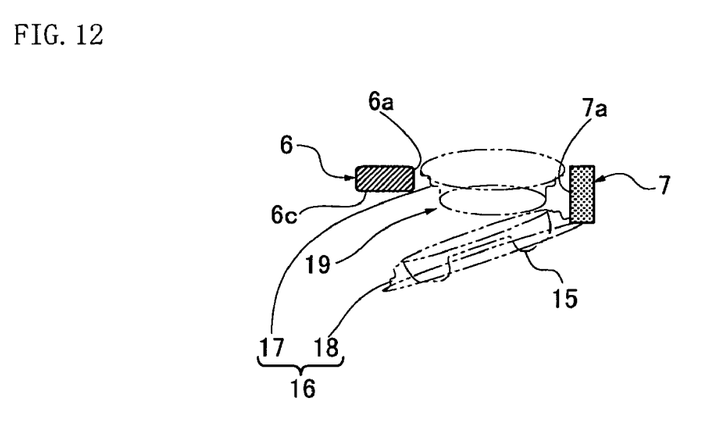
FIG. 12 is a schematic enlarged cross-sectional view of the spare-tire installation structure in accordance with one or more embodiments of the present disclosure, showing an example of the state of a spare tire after collision.

Referring now to FIGS. 10-12, a spare-tire installation structure in accordance with one or more embodiments of the present disclosure is shown. The same or equivalent elements as in the embodiments described above are denoted by the same reference numerals.

In the spare-tire installation structure as shown in FIGS. 10-12, the spare tire 10 may be installed such that the positions of the inner and outer drum portions 17 and 18 in the vertical direction are opposite to those shown in FIGS. 8 and 9.

In addition, the rear cross member 6, which may be provided instead of the wheel-fracture facilitating member 20 of the embodiments described above, may be disposed opposite the front end 12b of the circumferential surface of the spare tire 10 on the inner drum portion 17 side with respect to the junction 19, which may serve as the rigidity-varying portion of the spare tire wheel 11.

As shown in FIG. 11, the rear cross member 6 may have a shape with a width lying in the longitudinal direction of the vehicle 1. The rear surface 6a of the rear cross member 6 may be located on the inner drum portion 17 side such that the position of the bottom surface 6c of the rear cross member 6 in the vertical direction of the vehicle 1 may correspond with the position of the junction 19 in the vertical direction of the vehicle 1.

As shown in FIGS. 10-12, if the spare tire 10 is pushed toward the front of the vehicle 1 upon rear collision, the front end 12b of the circumferential surface of the spare tire 10 may come into abutment with the rear surface 6a of the rear cross member 6 on the inner drum portion 17 side thereof. Thus, a shearing force may act on the drum 16 of the spare tire wheel 11 with respect to the junction 19 in the longitudinal direction of the vehicle 1 to separate the outer drum portion 18 and the spoke surface 15 from the inner drum portion 17, as shown in FIG. 12.

Accordingly, there is no hindrance to facilitation of deformation upon rear collision in the rear section 2 of the vehicle 1. This may allow for the desired crushable zone to provide superior impact absorption properties.

In addition, the rear cross member 6 may be simply disposed on the inner drum portion 17 side with respect to the junction 19, which may serve as the rigidity-varying portion of the spare tire wheel 11. This may eliminate the need for another component and allows the impact absorption properties upon rear collision to be improved by a simple, lightweight structure.

Figure 13:
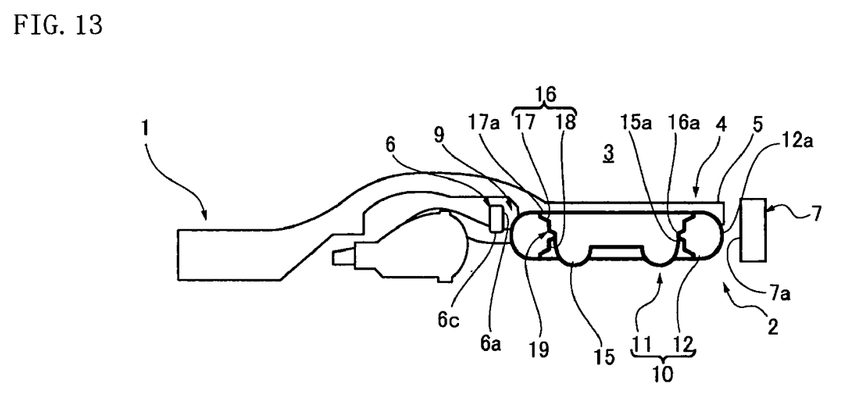
FIG. 13 is a schematic cross-sectional view, taken along a line corresponding to line C-C in FIG. 10, of a component of a spare-tire installation structure in accordance with one or more embodiments of the present disclosure.

Now referring to FIG. 13, a spare-tire installation structure in accordance with one or more embodiments of the present disclosure is shown. The same or equivalent elements as described above are denoted by the same reference numerals.

As shown in FIG. 13, the rear cross member 6 may be disposed in front of the spare-tire installation area 9 such that the width of the rear cross member 6 lies in the vertical direction of the vehicle 1. In addition, the position of the bottom surface 6c of the rear cross member 6 in the vertical direction of the vehicle 1 may correspond with the position of the junction 19 in the vertical direction of the vehicle 1.

In the spare-tire installation structure as shown in FIG. 13, the width of the rear cross member 6 may lie in the vertical direction of the vehicle 1. Thus, the rear surface 6a may provide a sufficient area for receiving pressure from the spare tire 10 while alleviating an increase in weight due to an increase in the cross-sectional area of the rear cross member 6.

Figure 14:
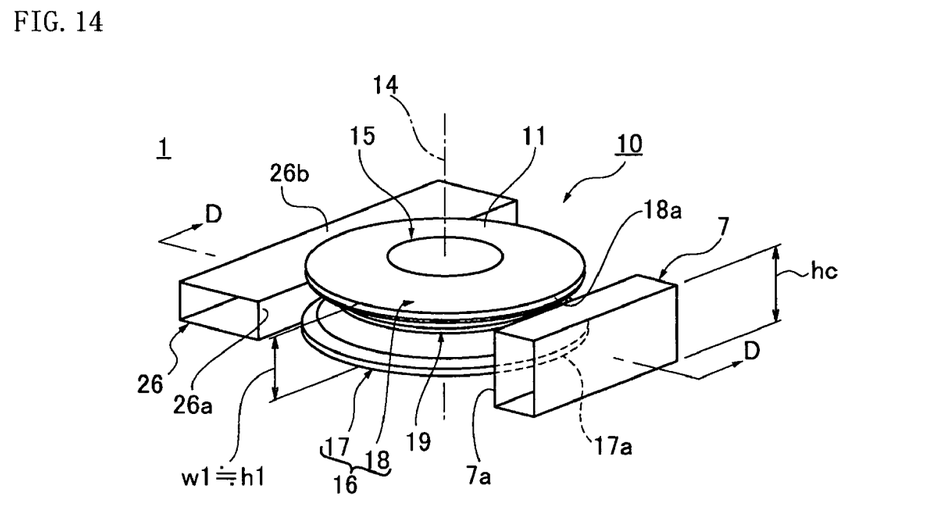
FIG. 14 is an enlarged perspective view of a component of a spare-tire installation structure in accordance with one or more embodiments of the present disclosure.
Figure 15:
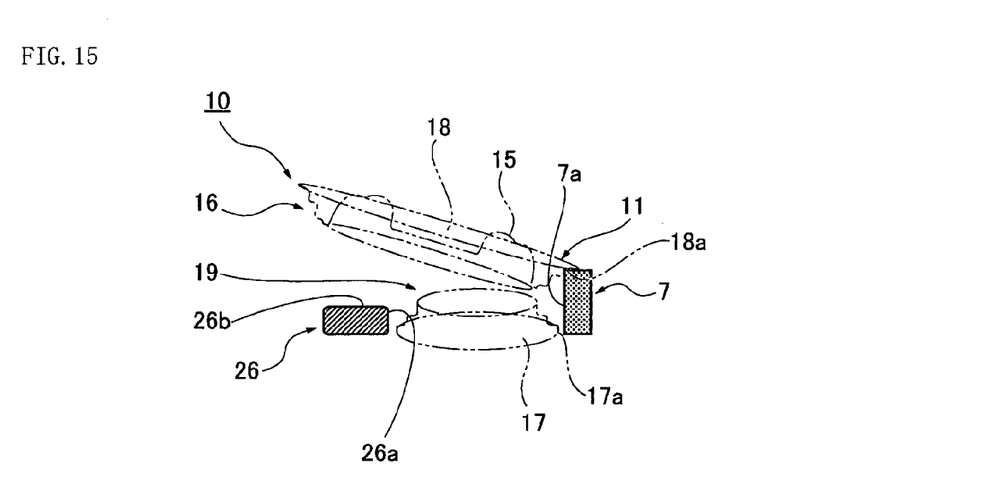
FIG. 15 is a schematic enlarged cross-sectional view, taken along line D-D in FIG. 14, of a spare-tire installation structure in accordance with one or more embodiments of the present disclosure, showing an example of the state of a spare tire after collision.

Now referring to FIGS. 14 and 15, a spare-tire installation structure in accordance with one or more embodiments of the present disclosure is shown. The same or equivalent elements as described above are denoted by the same reference numerals.

As shown in FIGS. 14 and 15, a rear cross member 26 may serve as the first rigid member and may extend in the lateral direction of the vehicle 1. The rear cross member 26 may be formed so as to have a substantially rectangular cross-sectional shape with a width lying in the longitudinal direction of the vehicle 1.

A rear surface 26a of the rear cross member 26 may be located adjacent to the spare tire 10, and the position of a top surface 26b of the rear cross member 26 in the vertical direction of the vehicle 1 may correspond with a position of the junction 19 in the vertical direction of the vehicle 1.

As shown in FIG. 14, the rim width w1 between the inner and outer rim rings 17a and 18a may be substantially equal to, or slightly smaller than, a height h1 of the tire body (not shown) in a substantially horizontal orientation on the side thereof facing the rear of the vehicle 1.

The rear bumper reinforcement 7, may be disposed opposite the rear of the spare tire 10, may be formed so that a height he of the front surface 7a of the rear bumper reinforcement 7 may be larger than a rim width w1 of the drum 16 of the spare tire wheel 11 and may exceed both rim ends thereof, that is, the inner and outer rim ring 17a and 18a, in the direction along the central axis of rotation 14, namely, the axle direction of the drum 16.

When the spare tire 10, including the spare tire body 12, is installed in a substantially horizontal orientation, the rear bumper reinforcement 7 may be located opposite the circumferential surface of the spare tire body 12 on the side 12a thereof facing the rear of the vehicle 1 along the vertical direction of the vehicle 1.

The front surface 7a of the rear bumper reinforcement 7 may come into abutment with the circumferential surface of the spare tire body 12 on the side 12a thereof facing the rear of the vehicle 1 along a height larger than the rim width w1 between the inner and outer rim rings 17a and 18a in the vertical direction.

As shown in FIG. 15, if the spare tire 10 is pushed toward the front of the vehicle 1 by the front surface 7a of the rear bumper reinforcement 7 as a result of deformation upon rear collision, the front end 12b of the circumferential surface of the spare tire 10 may come into abutment with the rear surface 26a of the rear cross member 26 on the inner drum portion 17 side.

The front surface 7a of the rear bumper reinforcement 7 may come into abutment with the circumferential surface of the spare tire body 12 (not shown) on the side 12a thereof facing the rear of the vehicle 1 along a height larger than the rim width w1 in the vertical direction of the vehicle 1, thus reliably pressing the spare tire 10 toward the front of the vehicle 1.

Thus, as indicated by the two-dot chain lines in FIG. 15, the spare tire 10 may be reliably moved toward the front of the vehicle 1 without rotating with the spare tire body 12 between the front surface 7a of the rear bumper reinforcement 7 and the rear ends of the inner and outer rim rings 17a and 18a. The spare tire 10 may be pressed between the front surface 7a of the rear bumper reinforcement 7 and the rear surface 26a of the rear cross member 26 disposed adjacent to the inner drum portion 17. A shear force may then act on the inner drum portion 17 of the drum 16 of the spare tire wheel 11 with respect to the junction 19 in the longitudinal direction of the vehicle 1.

As indicated by the two-dot chain lines in FIG. 15, the outer drum portion 18 and the spoke surface 15 may be separated diagonally upward from the inner drum portion 17 toward the front of the vehicle 1.

As shown in FIG. 15, the spare tire 10 may be pushed toward the front of the vehicle 1 and the front surface 7a of the rear bumper reinforcement 7 may come into abutment with the circumferential surface of the spare tire body 12 (not shown) on the side 12a thereof facing the rear of the vehicle 1 along the vertical direction of the vehicle 1.

Thus, the inner and outer rim rings 17a and 18a may be simultaneously pressed toward the front of the vehicle 1 so that the spare tire 10 may be stably and reliably moved toward the front of the vehicle 1.

In addition, when the front end 12b of the circumferential surface of the spare tire 10 may come into abutment with the rear surface 26a of the rear cross member 26 on the inner drum portion 17 side, the rear cross member 26 may ensure sufficient rigidity to receive a force applied in the longitudinal direction of the vehicle 1 without an increase in weight because the rear cross member 26 may have a width in the longitudinal direction of the vehicle 1.

Figure 16:
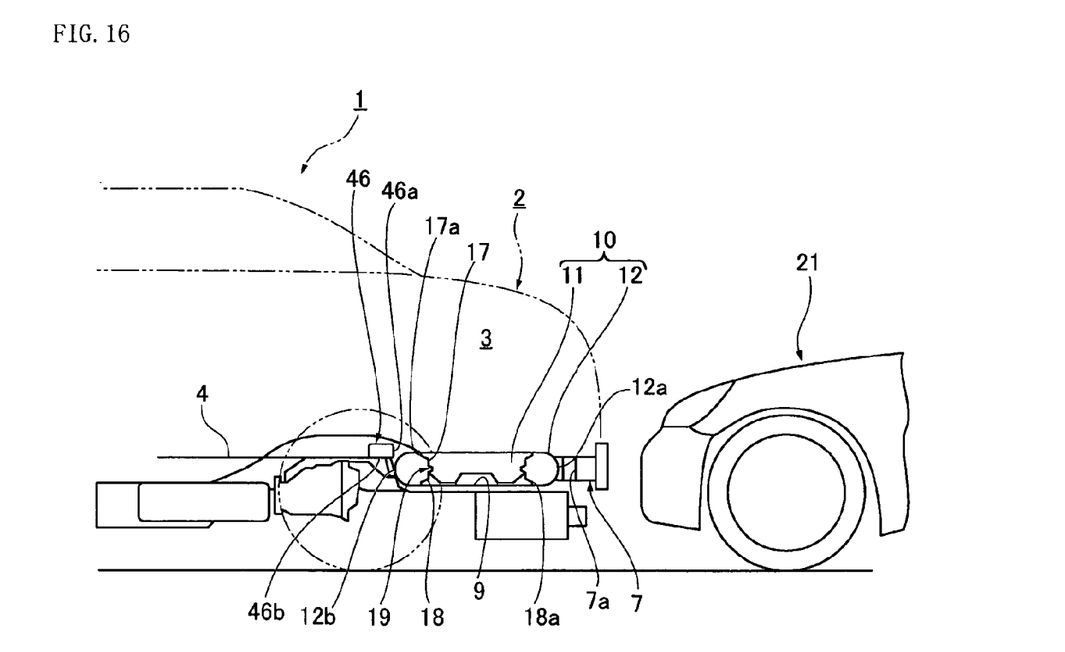
FIG. 16 is a schematic side view of a spare-tire installation structure of Example 7 of the embodiment, illustrating the rear structure of the vehicle before collision.
Figure 17:
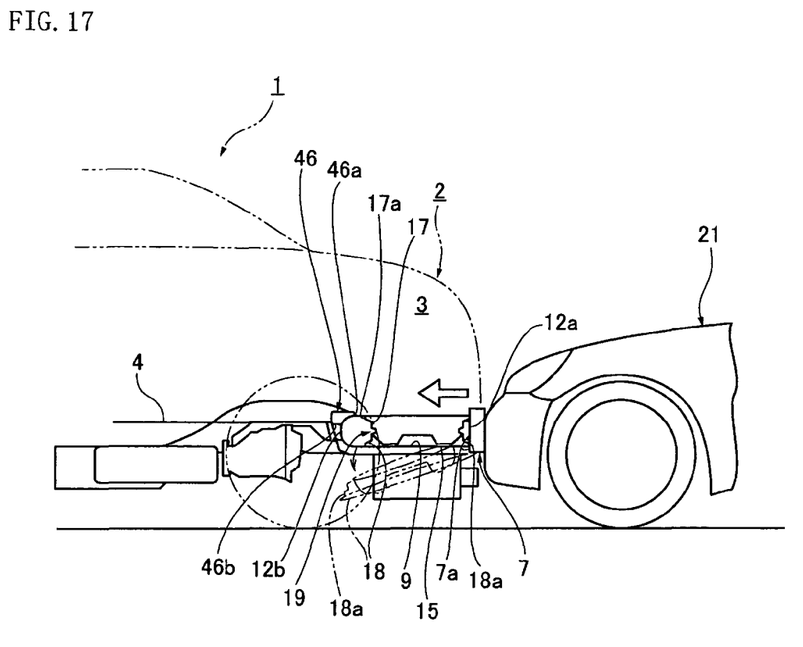
FIG. 17 is a schematic side view of the spare-tire installation structure in accordance with one or more embodiments of the present disclosure, illustrating the rear structure of the vehicle after collision.

Referring now to FIGS. 16 and 17, a spare-tire installation structure in accordance with one or more embodiments of the present disclosure is shown. The same or equivalent elements as described above are denoted by the same reference numerals.

As shown in FIGS. 16 and 17, a rear suspension member 46 that may serve as the first rigid member may be provided instead of the rear cross member 6 of the spare-tire installation structure as shown in FIG. 11 and in embodiments disclosed herein. The rear suspension member 46 may be provided on the forward side of the spare-tire installation area 9 with a longitudinal direction lying in the width direction of the vehicle 1.

The position of a bottom surface 46b of the rear suspension member 46 in the vertical direction of the vehicle 1 may correspond with the position of the junction 19 in the vertical direction of the vehicle 1. Thus, a rear surface 46a of the rear suspension member 46 may be located adjacent to the front end 12b of the circumferential surface of the spare tire body 12 of the spare tire 10 at the inner drum portion 17 side thereof The inner drum portion 17 may be disposed upward with respect to the junction 19 of the drum 16 of the spare tire wheel 11, that is, on the side facing away from the outer drum portion 18 with the spoke surface 15 facing downward.

In the spare-tire installation structure in accordance with one or more embodiments of the present disclosure and as shown in FIGS. 16 and 17, if another vehicle 21 collides with the rear section 2 of the vehicle 1, the front surface 7a of the rear bumper reinforcement 7 may press the spare tire 10 toward the forward side of the spare-tire installation area 9 in the vertical direction of the vehicle 1.

Thus, the spare tire 10 may be pushed and reliably moved toward the front of the vehicle 1 without rotating so that the front end 12b of the circumferential surface of the spare tire body 12 may come into abutment with the rear surface 46a of the rear suspension member 46 disposed on the side facing away from the spoke surface 15. Accordingly, the spare tire 10 may be held between the front surface 7a of the rear bumper reinforcement 7 and the rear surface 46a of the rear suspension member 46 and may be pressed therebetween in the longitudinal direction of the vehicle 1 so that a shear force may act around the junction 19 through the spare tire body 12.

As a result, the inner drum portion 17, located on the top side of the spare tire wheel 11, may be compressed in the longitudinal direction of the vehicle 1, whereas the outer drum portion 18 and the spoke surface 15 may be separated from the inner drum portion 17 toward the bottom of the vehicle 1. Thus, the existing rear suspension member 46 may be used as the first rigid member instead of providing another component such as the wheel-fracture facilitating member 20 as in embodiments described above.

At the same time, because the rear cross member 6 does not have to be used as the rigid member as in the embodiments described above, the flexibility of the layout, including the shape of the vehicle body and the position of the spare-tire installation area 9, may be increased. In addition, the structure may be simplified so that the possibility of increased weight may be reduced.

Figure 18:
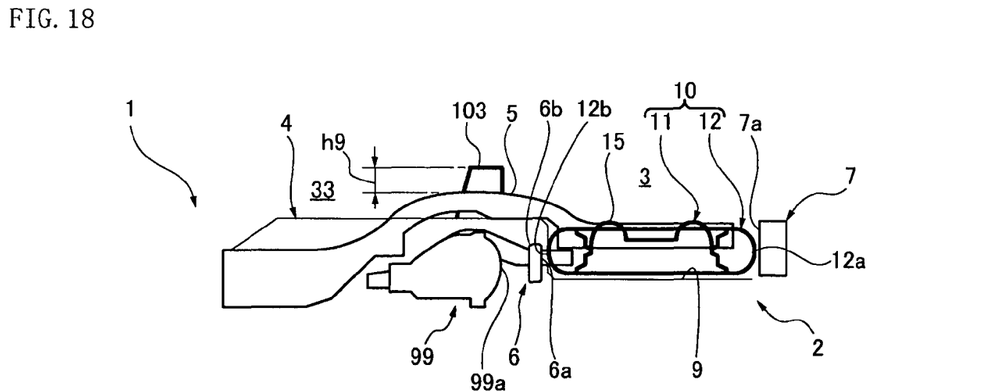
FIG. 18 is a schematic side view, partially in cross-section, of a spare-tire installation structure in accordance with one or more embodiments of the present disclosure.

Referring now to FIG. 18, a spare-tire installation structure in accordance with one or more embodiments of the present disclosure is shown. The same or equivalent elements as in the embodiments described above are denoted by the same reference numerals.

In the spare-tire installation structure as shown in FIG. 18, a cross member 103 may be provided between a cabin 33 and the trunk room 3 with its longitudinal direction lying in the lateral direction of the vehicle 1. The cross member 103 may protrude to a predetermined height h9 above the rear side members 5 so as to prevent a fractured and/or separated component of the spare tire 10 from intruding into the cabin 33.

In the spare-tire installation structure as shown in FIG. 18, the cross member 103 may be provided on the side of the rear cross member 6 facing the front of the vehicle 1 so as to protrude to the predetermined height h9 above the rear side members 5. Thus, the cross member 103 may block a fractured and/or separated component of the spare tire 10 from moving toward the front of the vehicle 1 upon rear collision and may prevent the fractured and/or separated component from intruding into the cabin 33.

Figure 19:
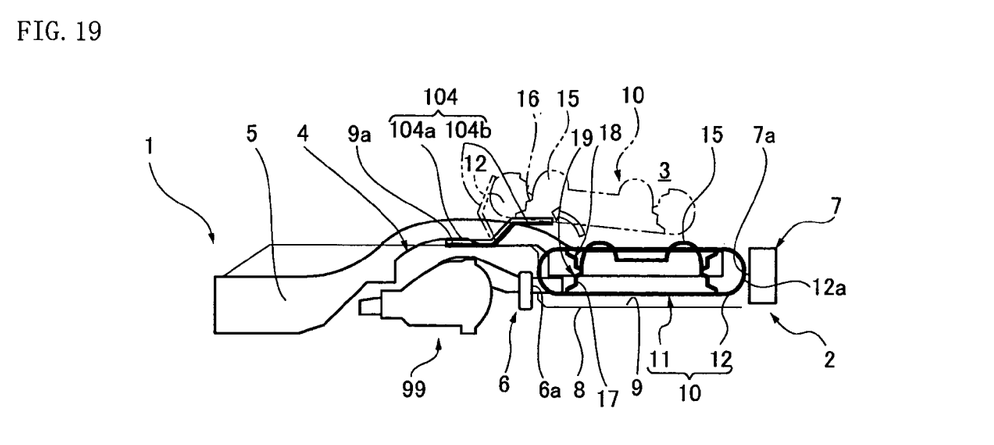
FIG. 19 is a schematic side view, partially in cross-section, of a spare-tire installation structure of Example 9 of the embodiment, illustrating the rear structure of the vehicle.
Figure 20:
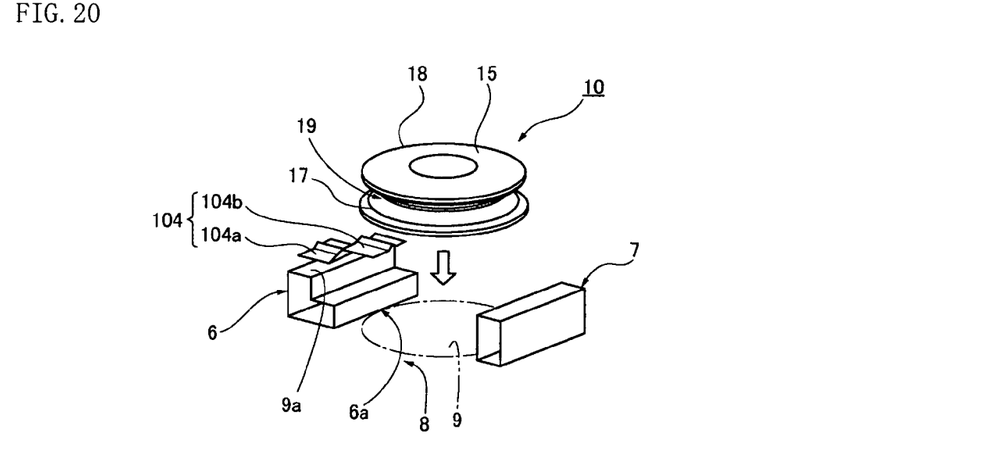
FIG. 20 is a schematic perspective view, partially in cross-section, of a spare-tire installation structure in accordance with one or more embodiments of the present disclosure.

Now referring to FIGS. 19 and 20, a spare-tire installation structure in accordance with one or more embodiments of the present disclosure is shown. The same or equivalent elements as in the embodiments described above are denoted by the same reference numerals.

In the spare-tire installation structure as shown in FIGS. 19 and 20, a guide stopper 104 may be attached to a front end 9a of the spare-tire installation area 9 on the floor 4 of the trunk room 3 formed in the rear section 2 of the vehicle 1 so as to cover part of a front top surface of the spare-tire installation area 9. The guide stopper 104 may include an attachment portion 104a attached to the front end 9a of the spare-tire installation area 9 and an energy-absorbing portion 104b extending from the attachment portion 104a toward the rear of the vehicle 1 so as to be substantially crank-shaped in side view, as indicated by the solid line in FIG. 19, and may be bendable toward the top of the vehicle 1, as indicated by the two-dot chain line.

In the spare-tire installation structure as shown in FIGS. 19 and 20, even if the spare tire body 12 of the spare tire 10, or the outer drum portion 18 and the spoke surface 15, is moved upward toward the front of the vehicle 1 upon rear collision, as indicated by the two-dot chain line in FIG. 19, the energy-absorbing portion 104b of the guide stopper 104 may be bent so as to absorb kinetic energy associated with the movement of the spare tire 10, thereby blocking the movement toward the front of the vehicle 1.

In accordance with one or more embodiments of the present disclosure, the entirety of the spare tire 10 may be moved or may not be moved; instead, the portion on the outer drum portion 18 side separated at the junction 19 bay be moved, with the inner drum portion 17 remaining in the spare-tire installation area 9. Thus, the target value for the amount of energy absorbed by the guide stopper 104 may be set to be lower than that absorbed when the guide stopper 104 receives the movement of the entire spare tire 10. Accordingly, a compact, lightweight guide stopper 104 may be used to alleviate an increase in the weight of the rear section 2 of the vehicle 1.

Figure 21:
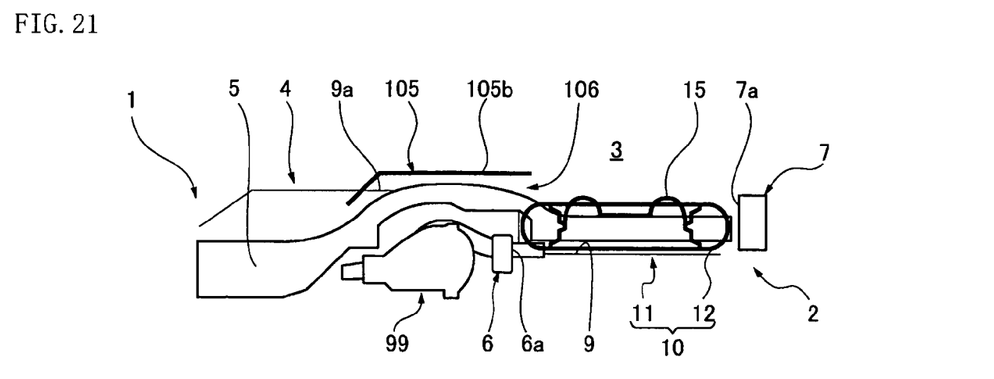
FIG. 21 is a schematic side view, partially in cross-section, of a spare-tire installation structure in accordance with one or more embodiments of the present disclosure.
Figure 22:
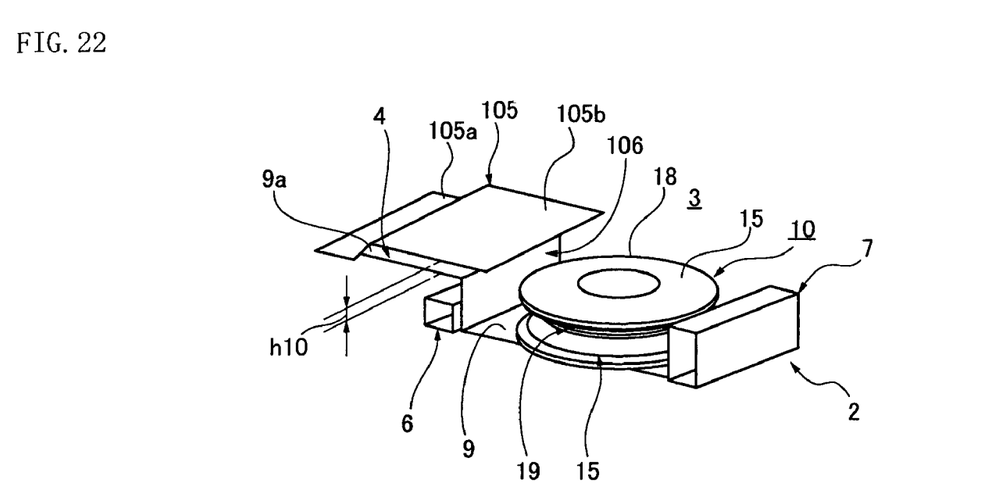
FIG. 22 is a schematic perspective view, partially in cross-section, of a spare-tire installation structure in accordance with one or more embodiments of the present disclosure.

Now referring to FIGS. 21 and 22, a spare-tire installation structure in accordance with one or more embodiments of the present disclosure is shown. The same or equivalent elements as in the embodiments described above are denoted by the same reference numerals.

In the spare-tire installation structure as shown in FIGS. 21 and 22, an upper floor panel 105 may be attached to the front end 9a of the spare-tire installation area 9 on the floor 4 of the trunk room 3 formed in the rear section 2 of the vehicle 1 so as to cover the front top surface of the spare-tire installation area 9 along the lateral direction of the vehicle 1. The upper floor panel 105 may include an attachment surface portion 105a attached to the front end 9a of the spare-tire installation area 9 and an upper partitioning portion 105b extending from the attachment surface portion 105a toward the rear of the vehicle 1 in a substantially flat shape so as to cover the front of the space above the spare-tire installation area 9, as indicated by the solid line in FIG. 21. A capturing space 106 having a predetermined height h10 in the vertical direction of the vehicle 1 may be formed between the front end 9a of the floor 4 and the upper partitioning portion 105b.

In the spare-tire installation structure as shown in FIGS. 21 and 22, even if the spare tire body 12 of the spare tire 10, or the outer drum portion 18 and the spoke surface 15, is moved from the spare-tire installation area 9 toward the front of the vehicle 1 upon rear collision, the capturing space 106 formed between the upper partitioning portion 105b of the upper floor panel 105 and the front end 9a of the floor 4 may receive the upper separated portion of the spare tire and prevent the separated portion from entering the passenger compartment of the vehicle.

In accordance with one or more embodiments of the present disclosure, the portion on the outer drum portion 18 side separated from the spare tire 10 at the junction 19 may be moved, with the inner drum portion 17 remaining in the spare-tire installation area 9. Thus, the target value for the amount of energy absorbed by the upper floor panel 105 required for the capturing space 106 to capture the spare tire 10 may be set to be lower than that absorbed when the upper floor panel 105 receives the movement of the entire spare tire 10. Accordingly, a compact, lightweight upper floor panel 105 may be used to alleviate an increase in the weight of the rear section 2 of the vehicle 1.

Although the spare-tire installation structures discussed herein have been described with reference to the drawings, specific structures are not limited thereto; the invention encompasses design changes that do not depart from the spirit of the invention and should only be limited by the accompanying claims.

That is, whereas the spare tire 10 shown in the embodiment described above has the spare tire body 12 fitted around the drum 16 of the spare tire wheel 11, the shape, number, and material of the spare tire are not particularly limited. It is possible to use a tire of any type or structure, such as a temporary tire, a run-flat tire, or a road tire, that may be accommodated in the spare-tire installation area 9 of the vehicle 1.

In addition, although the spare tire 10 is described with a spoke surface 15 internally adjacent to the outer drum portion 18, the type of spare tire is not so limited; the spoke surface may be internally adjacent to either of the drum portions that are, in use, located inside and outside in the axle direction, for example, to the inner drum portion 17.

In addition, although the wheel-fracture facilitating member 20 may be disposed adjacent to the inner drum portion 17 with respect to the junction 19 in the embodiment described above, the wheel-fracture facilitating member 20 may be disposed adjacent to the outer drum portion 18; that is, the wheel-fracture facilitating member 20 may be disposed adjacent to at least one of the inner and outer drum portions 17 and 18.

In addition, although the rigid member shown in the embodiment described above may be the wheel-fracture facilitating member 20, which may have the acute end 20a abutting the spare tire 10, and the rigid member shown in embodiments described herein is a wedge-shaped wheel-fracture facilitating member 22, which may have the shape of a substantially right triangle in side view and is configured such that the height h2 of the end 22a in the vertical direction of the vehicle 1 may be close to that of the junction 19 of the spare tire wheel 11 of the spare tire 10, the shape of the rigid member is not so limited; the rigid member may have any shape, such as a wedge shape, a triangular shape, an oblate shape, and/or any other geometric shape that may prevent the spare tire 10 from deviating and that may stably fracture the spare tire 10.

In addition, any portions of the first and second rigid members may come into abutment with the spare tire 10 in any manner. For example, the first and second rigid members may be constituted only by the rear cross member 6 and the rear bumper reinforcement 7, respectively, or may be constituted by a pair of front and rear cross members. The shapes, numbers, positions, and materials of the first and second rigid members are not particularly limited as long as the first and second rigid members can fracture the spare tire 10 by imposing a local load on the spare tire wheel 11 while preventing it from deviating.

In addition, although in the embodiments described above the front surface 7a of the rear bumper reinforcement 7 may come into abutment with the circumferential surface of the spare tire body 12 on the side 12a thereof facing the rear of the vehicle 1 along the height h1, another component such as a rear suspension member, a muffler, or a trailer hitch may be used instead of the rear bumper reinforcement 7. The shape, number, and material of the second rigid member are not particularly limited as long as the second rigid member can press the spare tire 10 in the spare-tire installation area 9 toward the first rigid member.

In addition, although described herein with the longitudinal direction of the cross-sectional shape of the rear cross member 6 lying in the vertical direction of the vehicle 1, as indicated by the solid line in FIG. 9, the direction is not limited thereto; for example, the direction may lie in the longitudinal direction of the vehicle 1 so that the position of the top surface 6b of the rear cross member 6 in the vertical direction of the vehicle 1 may correspond with the position of the junction 19 in the vertical direction of the vehicle 1, as indicated by the two-dot chain line in FIG. 9. The shape, number, and material of the rear cross member 6 are not particularly limited as long as the rear cross member 6 may be disposed adjacent to at least one of the inner drum portion 17, on which the spoke surface 15 is not disposed, and the outer drum portion 18 with respect to the rigid-varying portion of the drum 16, namely, the junction 19.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

The invention claimed is:

1. A spare tire installation structure for a vehicle, comprising:
   a first rigid member disposed within a trunk compartment of the vehicle; and a second rigid member configured vehicle rearward of the first rigid member and disposed within the trunk compartment of the vehicle,
   wherein the first rigid member and the second rigid member define a space to house a spare tire,
   wherein the second rigid member is configured to displace the spare tire vehicle forward and into the first rigid member in response to a rear collision to the vehicle, and wherein the first rigid member is configured to split a wheel of the spare tire.

2. The spare tire installation structure of claim 1, wherein the first rigid member further comprises a wheel-fracture facilitating member.

3. The spare tire installation structure of claim 2, wherein the wheel-fracture facilitating member comprises a wedge.

4. The spare tire installation structure of claim 2, wherein the wheel-fracture facilitating member forms at least one of an isosceles triangle, a right triangle, and a rectangle when viewed from a vehicle side.

5. The spare tire installation structure of claim 1, wherein the second rigid member comprises an upper surface extending to a position higher in a vehicle upward direction than the first rigid member.

6. The spare tire installation structure of claim 1, further comprising a guide stopper disposed above the space to house a spare tire.

7. The spare tire installation structure of claim 6, wherein the guide stopper is configured to prevent the spare tire from entering a passenger compartment of the vehicle.

8. The spare tire installation structure of claim 1, wherein the first rigid member is configured to split a wheel of the spare tire along a rigidity varying portion of the spare tire.

9. A method to split a spare tire of a vehicle, comprising:
disposing a first rigid member in a trunk compartment of the vehicle;
disposing a second rigid member in the trunk compartment and vehicle rearward of the first rigid member;
disposing a spare tire between the first rigid member and the second rigid member; and
configuring the second rigid member to displace the spare tire vehicle forward and into the first rigid member in response to a rear-end collision to the vehicle,
wherein the first rigid member is configured to split a wheel of the spare tire.

10. The method of claim 9, further comprising disposing a guide stopper above the spare tire.

11. The method of claim 9, wherein the second rigid member extends to a position higher in the vehicle vertical direction than the first rigid member.

12. The method of claim 9, wherein configuring the second rigid member comprises disposing a wheel-fracture facilitating member on a surface.

13. A spare tire installation structure of a vehicle, comprising:
a means for displacing a spare tire disposed in a trunk compartment of a vehicle;
a means for splitting a wheel of the spare tire disposed in the trunk compartment and vehicle forward of the means for displacing the spare tire,
wherein the means for displacing the spare tire is configured to displace the spare tire in a vehicle forward direction into the means for splitting a wheel in response to a rear-end collision to the vehicle.

14. The spare tire installation structure of claim 13, further comprising a means for preventing the spare tire from entering the passenger compartment of the vehicle.

15. The spare tire installation structure of claim 13, wherein the means for splitting the wheel of the spare tire comprises a means for facilitating a fracturing of a wheel of the spare tire.

16. The spare tire installation structure of claim 15, wherein the means for facilitating a fracturing comprises a wedge.

17. The spare tire installation structure of claim 15, wherein the means for facilitating a fracturing of the wheel of the spare tire forms at least one of an isosceles triangle, a right triangle, and a rectangle when viewed from a vehicle side.

18. The spare tire installation structure of claim 13, wherein the means for displacing a spare tire comprises an upper surface extending to a position higher in a vehicle upward direction than the means for splitting a wheel of the spare tire.

19. The spare tire installation structure of claim 13, wherein the means for splitting a wheel of the spare tire is configured to split a wheel of the spare tire along a rigidity varying portion of the spare tire.

20. The spare tire installation structure of claim 1, wherein the second rigid member comprises a lower surface extending to a position lower in a vehicle upward direction than the first rigid member.

21. The method of claim 9, wherein the second rigid member extends to a position lower in the vehicle vertical direction than the first rigid member.

22. The spare tire installation structure of claim 13, wherein the means for displacing a spare tire comprises a lower surface extending to a position lower in a vehicle upward direction than the means for splitting a wheel of the spare tire.

* * * * *